June 20, 1950   W. E. WILLIAMS   2,512,404
GAS RANGE
Filed Aug. 13, 1945
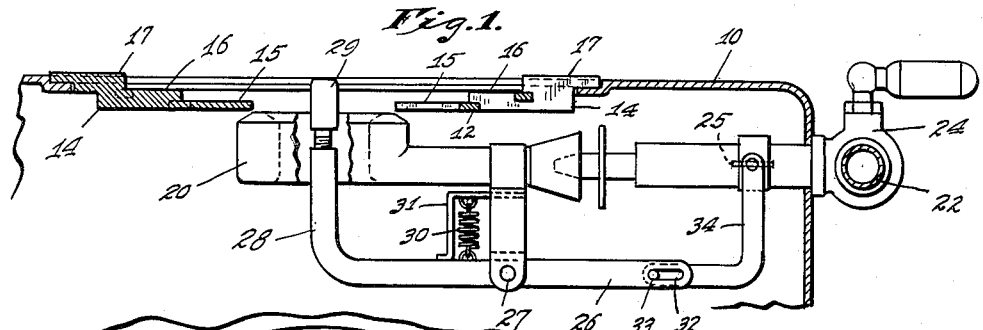
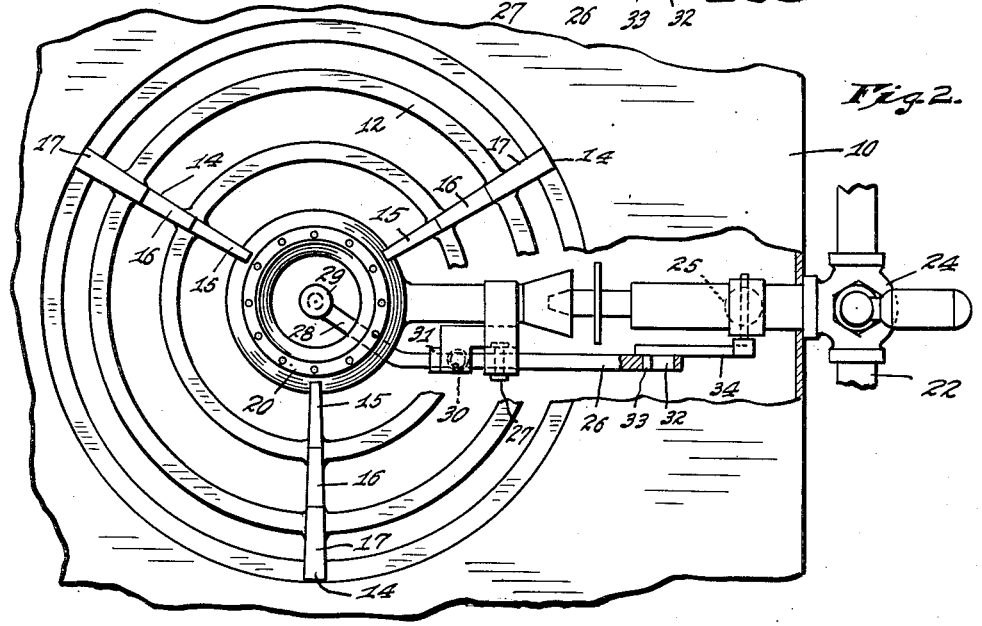
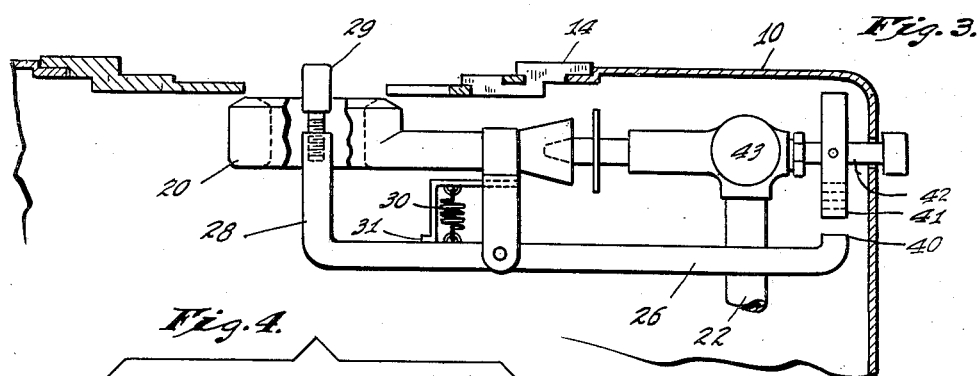
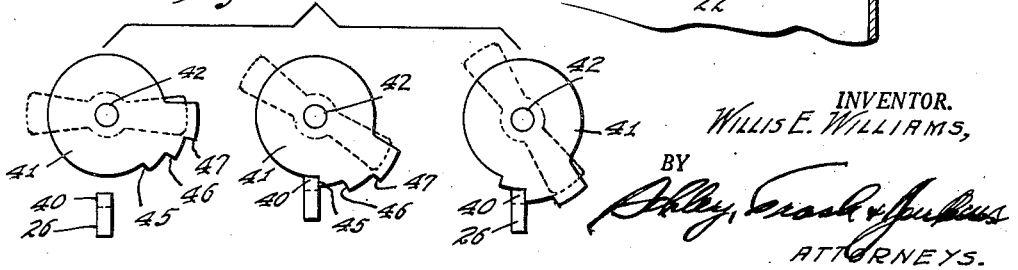
INVENTOR.
WILLIS E. WILLIAMS,
BY
ATTORNEYS.

Patented June 20, 1950

2,512,404

UNITED STATES PATENT OFFICE 2,512,404

GAS RANGE

Willis E. Williams, Shelbyville, Ind., assignor to Chambers Corporation, Shelbyville, Ind., a corporation of Indiana Application August 13, 1945, Serial No. 610,638

4 Claims. (Cl. 126—52)

My invention relates to gas ranges and more particularly to a means for automatically proportioning the rate of gas consumption to the size of the utensil being heated. In the heating of relatively small utensils much gas is frequently wasted by burning it at a rate greater than a small utensil can absorb the heat produced.

It is the object of my invention to provide a gas burner which will automatically limit the rate of gas consumption proportionately to the size of the utensil being heated. A further object of my invention is to provide a combination of an automatically regulated gas burner with a utensil-support which will hold the utensil at the proper elevation above the burner. Still another object of my invention is to produce a device which can be economically constructed and simply installed and which will operate to reduce wastage of gas and to promote efficient use thereof.

In carrying out my invention I associate with the gas burner a utensil support having stepped supporting surfaces so arranged that the distance between the bottom of the utensil and the burner will increase as the size of the utensil increases, and I provide means responsive to the elevation of the utensil for limiting the rate at which gas can be supplied to the burner.

The accompanying drawings illustrate my invention: Fig. 1 is a fragmental vertical section through the cooking top of a gas range; Fig. 2 is a fragmental plan view with portions of the cooking top broken away; Fig. 3 is a view similar to Fig. 1, but showing a modified construction; and Fig. 4 is a detail view of an element forming part of the modification shown in Fig. 3.

In the device illustrated in Figs. 1 and 2, the cooking top includes a frame 10 provided with an opening for the reception of a utensil support 12 including an annular series of radial ribs 14, shown as three in number, upon which a utensil to be heated is adapted to rest. The upper surface of each rib 14 is stepped to provide three utensil-supporting surfaces 15, 16, and 17 of progressively increasing height from the center toward the periphery of the utensil-support.

Below the center of the utensil-support there is mounted a gas burner 20, here shown as of the annular type but which may have any desired form. The burner 20 is supplied with gas from a supply pipe 22 under the control of a manually operated valve 24. The pipe 22 also includes, preferably between the valve 24 and the burner 20, a second valve 25 by operation of which automatic control of the gas to the burner 20 is effected through the means now to be described.

The means employed for automatically operating the valve 25 may take any convenient form. The form shown in the drawing comprises a lever 26 which is pivoted intermediately, as indicated at 27, and which extends from a point beneath the burner to a point adjacent the valve 25. At its inner end, the lever 26 is provided with an upward extension 28 in which an abutment 29 is screw-threadedly mounted for vertical adjustment. A spring 30 acting on the lever 26 urges the abutment 29 upwardly, movement of the lever under the action of the spring being limited by a stop member 31. At its outer end, the lever 26 is provided with a longitudinally extending slot 32 which receives a pin 33 carried by an arm 34 rotatable with the valve 25. The arrangement is such that with the lever 26 held against the abutment 31 by the action of the spring 30, the valve 25 will be in fully open position. Upon depression of the abutment 29, the lever 26 will swing in a counter-clockwise direction against the force exerted on it by the spring 30, thus raising the pin 33 in the slot 32 and causing the arm 34 to swing in a clockwise direction and move the valve 25 toward closed position. When the abutment 29 is relieved of any downward force capable of depressing it, the spring 30 moves the lever 26 in a clockwise direction to restore the valve 25 again to open position.

The parts of the device shown in Figs. 1 and 2 are there illustrated in the positions they occupy when no utensil is present on the utensil-support 12. In this condition, the spring 30 holds the lever 26 against the stop member 31, and the abutment 29 is substantially flush with the upper steps 17 of the ribs 14. In this condition, the valve 25 is fully open. If a utensil large enough to rest on the steps 17 is placed upon the utensil-support 14, no change in the position of the lever 26 takes place, the valve 25 remains fully open, and the rate at which gas is supplied to the burner 20 is under the complete control of the manually operated valve 24. If, however, the utensil is small enough to pass between the inner ends of the steps 17 and thus to permit the utensil to rest upon the steps 16, the bottom of the utensil will depress the abutment 29 and rotate the lever 26 to effect a partial closing of the valve 25. With the valve 25 partially closed in such manner, the maximum rate at which gas can be supplied to the burner is reduced. If the utensil is still smaller, so that its bottom may rest on the inner and lowermost steps 15, the abutment will be still further depressed and the valve 25 still further closed.

The steps 15, 16, and 17 not only cooperate with the mechanism 26—33—34 in effecting an automatic control of the valve 25, but also serve to support the utensil at or near the proper height in respect to the flame from the burner 20. That is, when a small utensil is resting on the steps 15 and the gas supply is limited by the valve 25 so that only a relatively low flame is possible, the utensil will be supported closer to the burner 20 than will a larger utensil resting on the steps 16 or a still larger one resting on the steps 17. This is a decided advantage; since the temperature of a gas-burner flame varies at different points in its height, and greatest efficiency is obtained when the bottom of the utensil being heated is at or near the hottest point of the flame.

In the modified arrangement illustrated in Figs. 3 and 4 a single valve is employed to control gas flow to the burner, and the automatic means operates to limit the extent to which such valve can be opened. In the arrangement of Figs. 3 and 4, the outer end of the lever 26, instead of being connected to an auxiliary valve, extends forwardly and is provided at its front end with an abutment 40 cooperating with a stepped stop member 41 rotatable with the stem 42 of a manually controlled valve 43. The steps of the stop member 41 provide three angularly spaced shoulders 45, 46, and 47 any of which, depending on the elevation of the abutment 40, may engage the abutment to limit opening movement of the valve stem 42. As in the case of the modified arrangement shown in Figs. 1 and 2, the position of the lever 26 depends upon the size of the utensil supported upon the ribs 14, and hence the maximum rate at which gas can be supplied to the burner 20 is limited in accordance with the size of the utensil so supported. For example, with a small utensil on the steps 15, the abutment 40 will have its maximum elevation and will be in position to engage the first shoulder 45 on the stop member 41 and thus limit opening of the valve 43 to a partially open condition. If the utensil is of such a size that it rests on the intermediate steps 16, the abutment 40 will be lowered to a position such that the shoulder 45 will clear it but the shoulder 46 will engage it, thus permitting a further, but still not complete, opening of the valve. With a large utensil, one supported on the uppermost steps 17, the abutment 40 will be depressed so that it will be cleared by the intermediate shoulder 46 and engaged by the outer shoulder 47, in which condition the valve 43 will be fully open.

Both constructions described possess the advantage that the maximum rate at which gas is supplied to the burner is limited automatically in accordance with the size of the utensil, thus preventing the waste of gas which would otherwise occur if heat was produced at a rate greater than that at which it could be absorbed by the utensil. In addition, both constructions have the advantage that elevation of the utensil-bottom above the burner is proportioned to the maximum burner-flame. In each construction free adjustment of the manually operated valve is permitted to reduce the rate of gas flow below the maximum determined by the size of the utensil.

If it is desired at any time to eliminate the restriction placed upon the maximum rate of gas-supply, it is only necessary to remove the abutment 29 from the inner end of the lever 26, as the upper end of the upward extension 28 on such lever lies below the plane of the steps 15 at all times. Adjustment of the abutment 29 in the lever-extension 28 may be availed of to compensate for variations in the relative elevations of the ribs 14, the burner 20, the pivot 28, or the lower end of the stop member 31.

I claim as my invention:

1. In a range, a stationary burner, a utensil-support above said burner, said support having an upper surface which is lower near the center of the support than near the periphery thereof whereby a small utensil on said burner will be closer to said burner than will a large utensil, a single vertically movable abutment associated with said support near the center thereof for engagement with the bottom of a utensil thereon, yieldable means urging said abutment upwardly, a manually operated valve for controlling the supply of fuel to said burner, and means responsive to movement of said abutment for limiting opening movement of said valve, said means operating to reduce the extent of valve-opening movement upon depression of said abutment.

2. In a range, a stationary burner, a utensil-support above said burner, said support having an upper surface which is lower near the center of the support than near the periphery thereof whereby a small utensil on said burner will be closer to said burner than will a large utensil, a single vertically movable abutment associated with the burner-support near the center thereof and in position to engage the bottom of a utensil supported thereon, means biasing said abutment upwardly to maintain it in engagement with the bottom of a utensil on the support, a fuel valve for controlling the rate of fuel-supply to said burner, a valve-operating member, and means connected to said abutment and co-operating with said member to limit valve-opening movement thereof, said means acting to reduce the extent of valve-opening movement upon depression of said abutment.

3. The invention set forth in claim 2 with the addition that said valve-operating member is manually operable.

4. The invention set forth in claim 2 with the addition that said valve-operating member is rotatable, a stop member rigid with said valve-operating member and having a plurality of angularly and radially spaced stops, the means for limiting valve-movement including a limiting member movable radially of said stop member and operatively connected to said abutment.

WILLIS E. WILLIAMS.

REFERENCES CITED

The following references are of record in the file of this patent:

UNITED STATES PATENTS

| Number | Name | Date |
|---|---|---|
| 1,067,434 | Lott | July 15, 1913 |
| 1,296,406 | Kyriakos | Mar. 4, 1919 |
| 1,385,763 | Pearce-Towel | July 26, 1921 |
| 1,503,276 | Marvel | July 29, 1924 |
| 1,534,577 | Ernst | Apr. 21, 1925 |
| 2,234,550 | Bridgeman | Mar. 11, 1941 |

FOREIGN PATENTS

| Number | Country | Date |
|---|---|---|
| 15,337 | Switzerland | Jan. 9, 1898 |
| 41,737 | France | Jan. 6, 1933 |
| 147,385 | Switzerland | June 15, 1931 |
| 151,995 | Great Britain | Jan. 4, 1922 |